United States Patent [19]

Schumacher

[11] Patent Number: 5,414,398
[45] Date of Patent: May 9, 1995

[54] ELECTROMAGNETIC VALVE WITH INJECTION-MOLDED VALVE-CLOSING PART

[75] Inventor: Steffen Schumacher, Renningen, Germany

[73] Assignee: Robert Bosch GmbH, Stuttgart, Germany

[21] Appl. No.: 129,432

[22] Filed: Sep. 30, 1993

[30] Foreign Application Priority Data

Dec. 19, 1992 [DE] Germany ............. 42 43 179.4

[51] Int. Cl.[6] .................. H01F 3/00; F16K 31/02
[52] U.S. Cl. ................. 335/255; 251/129.15; 251/129.21
[58] Field of Search ............ 251/129.14, 129.15, 251/129.16, 129.21; 335/255, 256, 257, 258, 259

[56] References Cited

U.S. PATENT DOCUMENTS

| | | | |
|---|---|---|---|
| 2,820,604 | 1/1958 | Ray | 251/129.16 |
| 3,422,850 | 1/1969 | Caldwell | 251/129.16 |
| 5,042,448 | 8/1991 | Cook | 123/585 |
| 5,088,520 | 2/1992 | Haynes | 137/270 |
| 5,178,116 | 1/1993 | Fehrenbach | 123/518 |
| 5,220,301 | 6/1993 | Haas | 335/278 |

FOREIGN PATENT DOCUMENTS 8711602  2/1989 Germany.

*Primary Examiner*—Leo P. Picard
*Assistant Examiner*—Stephen T. Ryan
*Attorney, Agent, or Firm*—Michael J. Striker

[57] ABSTRACT

An electromagnet valve has a housing having an end side, a magnet coil and a magnet armature received in the housing, a valve member, and a valve closing part provided at the end side of the housing and connected with the latter by a flange connection. The valve closing part has a valve seat which cooperates with the valve member, a pressure chamber surrounding the valve seat, and at least one pressure medium passage connected with the valve seat. The valve closing part is composed of injection molded synthetic plastic and has at an end side facing the housing a ring-shaped recess which surrounds the pressure chamber at a distance from the latter.

6 Claims, 1 Drawing Sheet

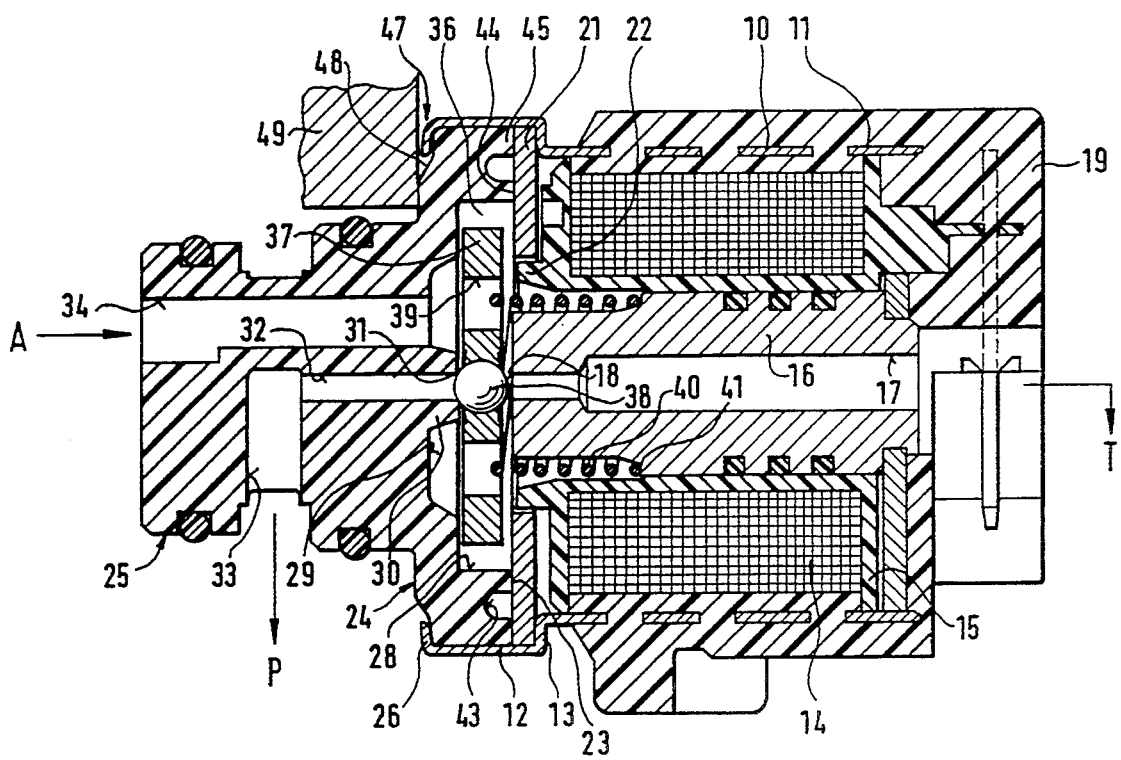

ELECTROMAGNETIC VALVE WITH INJECTION-MOLDED VALVE-CLOSING PART

BACKGROUND OF THE INVENTION

The present invention relates to electromagnetic valves.

More particularly, it relates to an electromagnetic valve which has a housing accommodating a magnet coil and a magnet armature, and a valve closing part having a valve seat which cooperates with a valve member and a pressure chamber which surrounds the valve seat and a pressure medium passage connected with the valve seat.

Electromagnetic valves of the above-mentioned general type are known in the art. One of such electromagnetic valves is disclosed, for example, in the German document DE-GM-87 11 602. In such electromagnetic valves, a valve closing part is mounted on the magnet housing which accommodates a magnet coil, one pole of the electromagnet and the magnet armature. A valve seat and a pressure medium passage connected with it are formed in the valve closing part. The connection between the magnet housing and the valve closing part is formed from cost considerations by a flanging connection. In other words, a circumferential edge of the magnet housing is flanged around a flange-like edge of the valve closing part. Such flange connections in the known electromagnetic valve between the magnet housing and the valve closing part were composed only of metal. When testing the valve closing parts were made of synthetic plastic, the flanging forces could not be taken up, or the flanging connection substantially worsened by reducing its strength or shape stability after a relatively short operational time due to shrinkage of the synthetic plastic, its softening or deformation. This can lead to untightness of the valve and to its failure.

SUMMARY OF THE INVENTION

Accordingly, it is an object of the present invention to provide an electromagnetic valve of the above-mentioned general type, which avoids the disadvantages of the prior art.

In keeping with these objects and with others which will become apparent hereinafter, one feature of the present invention resides, briefly stated, in an electromagnetic valve in which, in accordance with the present invention, the valve closing part is composed of injection molding plastic, and at the end side which faces the housing, a ring-shaped recess is formed and surrounds the pressure chamber at a distance from it.

When the electromagnetic valve is designed in accordance with the present invention, it has the advantage that due to its shaping and the material joint produced during its manufacture, a firm and long-term connection is obtained. Thereby, light and operationally-secure electromagnetic valves can be produced with inexpensive materials and inexpensive manufacturing processes.

In accordance with another feature of the present invention, the recess can have a substantially semi-circular cross-section. The valve closing part, at least in the region of the end side, can also have a circular cross-section.

A first abutment body can be formed in the end side of the valve closing part between the recess and the pressure chamber, and a second abutment body can be formed between the recess and the outer periphery of the valve closing part. The wall thickness of the first, inner abutment body, can be smaller than that of the second abutment body.

The flanged end of the magnet casing can abut in a rearwardly extending ring portion at the flange-like end of the valve closing part. The depth of this ring portion can be insignificantly greater than the thickness of the free, flanged end of the magnet casing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single Figure of the drawings is a view schematically showing a longitudinal section of an electromagnetic valve in accordance with the present invention.

DESCRIPTION OF A PREFERRED EMBODIMENT

An electromagnetic valve in accordance with the present invention has a stepped, cylindrical magnet housing 10 with a housing portion 11 having a smaller diameter and a closing portion 12 having a greater diameter. The transition between the closing portion 12 and the housing portion 11 is formed as a step 13.

A magnet coil 14 together with a coil body 15 is arranged in the interior of the housing portion 11. A cylindrical pole 16 of the electromagnet is located in the recess of the coil body 15. It has a throughgoing, stepped longitudinal opening 17 with an end side which faces the closing portion 12 and is formed as a first valve seat 18. The housing portion 11 of the magnet housing 10, the magnet coil 14 and a part of the outer periphery of the pole 16 are imbedded in a synthetic plastic body 19 extending up to the proximity of the step 13.

A flux guiding ring 21 is inserted in the closing portion 12 of the magnet housing 10 from its open side. It abuts against the step 13 and surrounds a ring-projection 22 of the coil body 15 and the end side of the pole element 16. The flux guiding ring 21 at its end facing away from the step 13 abuts with its end side 23 against the flange-like end 24 of the valve closing part 25. It is firmly connected with the magnet housing 10 by a flanging of the free end 26 of the closing portion 12 around the flange-like end 24 of the valve closing part 25.

A cylindrical depression 28 is formed in the end side 23 of the valve closing part 25. A ring groove 29 extends on its base. A second valve seat 31 is formed on a projection 30 which is enclosed by the ring groove 29. A longitudinal opening 32 extends from the valve seat 31 in the valve closing part 25. The longitudinal opening 32 is connected with the valve closing part 25 with a pressure passage 33 which extends from outside. A further longitudinal opening 34 extends eccentrically through the valve closing part 25 and opens into the ring groove 29.

The depression 28 in the valve closing part 25 forms a pressure chamber or an armature chamber 36, in which a disk-shaped plate armature 37 is guided. The plate armature 37 is provided in its center with a pressed-in valve ball 38 which cooperates with the oppositely located valve seats 31 and 18 correspondingly. The plate armature 37 has several passages 39 for guiding a pressure medium. It is also spring-loaded at its side end facing the pole element 16 by a pressure spring 40, whose other end is supported on a step 41 at the outer periphery of the pole element 16.

The electromagnetic valve in accordance with the present invention operates in the following manner. The electromagnetic valve is formed as a three/two-way valve, and the longitudinal opening 34 is connected with a consumer whose connection is identified as A. The radial pressure passage 33 leads to a pressure medium source whose connection is identified with B, and the longitudinal opening 17 which extends through the pole element leads to a container (return) whose connection is identified with T. In the shown switching position of the electromagnet, the magnet coil 14 is not supplied with current, and the plate armature 37 with the valve member 38 is pressed against the second valve seat 31 under the action of the pressure spring 40, so that the valve seat is closed by the valve member 38. In this switching position, the pressure passage 33 and the longitudinal opening 32 are closed at one side, while the consumer A is connected through the longitudinal opening 34, the ring groove 29 and the pressure chamber 36 at the open first valve seat 18 via the longitudinal opening 17 with the container. When the magnet coil 14 is supplied with current, the plate armature 13 is pulled against the action of the pressure spring 40, so that the valve member 38 closes the first valve seat 18. Thereby the container connection T is closed at one side, while the connection P of the pressure medium source and the consumer connection A are connected through the ring groove 29 and the pressure chamber 36 as well as the open second valve seat 31 with one another.

The valve closing part 25 is composed of an injection molded synthetic plastic which is preferably a thermoplastic, such as for example polyamide, which can preferably be glass-fiber reinforced, or polyphenylensulfide. For producing a strong and durable connection between the valve closing part 25 and the magnet housing 10, a ring-shaped recess 43 is formed in the end side 23 of the flange-like end 24. The recess extends between the depression 28 (pressure chamber 36) and the outer periphery. In order to eliminate or minimize pressure stresses in this region, the recess is formed with a substantially semi-circular cross-section. Due to this ring-shaped recess 43, a first, inner ring-shaped abutment body 44 can be formed between the recess 43 and the depression 28, and a second ring-shaped abutment body 45 can be formed between the recess 43 and the outer periphery. Both the inner abutment body 44 and the outer abutment body 45 abut against the flux guiding ring 21. During manufacture (injection molding) of the valve closing part 25, the recess 43 is formed by a forming ring. During injection molding of the valve closing part 25, due to the recess 43 provided by the forming part and the formation of both abutment bodies 44 and 45, the macro molecules of the synthetic plastic are oriented in the longitudinal direction (power flux direction). This leads to a high strength, a high modulus of elasticity, and a high yield strength of the material. The longitudinal orientation of the macro molecules leads moreover to lower heat expansion and thereby lower thermal stress and smaller shrinkage or creep.

The connection between the valve closing part 25 and the magnet housing 10 is formed, as described hereinabove, by a flanging process. A flanging tool abuts against the step 13, while a second tool bends the free end 26 of the magnet casing. During the flanging process, the flange-like end 24 of the valve closing part 25 is compressed in the region of the flange connection. Thereby, due to the formation of the recess 43, a spreading of both abutment bodies 44 and 45 occurs, so that an overstressing of the relatively brittle synthetic plastic is avoided. Simultaneously, a return springing of the flanged free end 26 can be compensated by unloading due to the return shaping. It is advantageous when the wall thickness of the inner abutment body 44 is smaller than the wall thickness of the outer abutment body 45, so that the spreading is performed inwardly substantially by a movement of the inner abutment body 44.

The formation of the ring-shaped recess 43 or both ring-shaped abutment bodies 44 and 45 has the advantage that with high pressures in the pressure chamber 36, untightness is avoided. High pressure in the pressure chamber 36 without the formation of the recess 43 would lead to the situation in which the pressure chamber 36 expands and the ring element which abuts against the flux guiding ring 21 is lifted in a wedge-shaped fashion. Due to the above-described formation, it is ensured that in unfavorable cases, only the inner abutment body 44 is pressed outwardly, or in other words, lifted in a wedge-shaped manner. The outer abutment body 45, however, slightly abuts against the flux guiding ring 21. Therefore a bending of the flange connection is reliably prevented.

In order to avoid or reduce voltage peaks in the valve closing part 25 in the region of the flanging, the flange edge 47 of the flange-like end 24, in the region of the free end 26 of the closing portion 12 is rounded. Due to this predetermined (shape connected) rounding, during the injection molding, the macro molecules and the reinforcing material (glass fiber) are directed or oriented. Thereby a high-edge layer-elasticity and yield expansion is obtained. Due to the rounding, in contrast to a sharp-edge angled structure, reinforcing material in this region is deposited in sufficient quantity. The flanged, free end 26 of the closing portion 12 abuts against a rearwardly extending ring portion 48 of the flange-like end 24, which extends from the outer periphery. The depth of the ring portion 48 is somewhat greater than the thickness of the flanged free end 26 of the closing portion 12. All transitions in the ring portion 48 are rounded for avoiding the stress peaks.

The depth of the ring portion 48 is selected so that with the built-in electromagnet 12, only a flat ring gap remains between the bent free end 26 of the closing portion 12 and the housing wall 49 of the inner space. Therefore, it is guaranteed that in the event of a weakening or creeping of the valve closing part due to long super-high temperature action, the bent fixed edge (free end 26) of the closing portion 12 abuts against the housing wall 49. Thereby substantial damage or a failure of the electromagnet is prevented.

It will be understood that each of the elements described above, or two or more together, may also find a useful application in other types of constructions differing from the types described above.

While the invention has been illustrated and described as embodied in an electromagnetic valve, it is not intended to be limited to the details shown, since various modifications and structural changes may be made without departing in any way from the spirit of the present invention.

without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electromagnet valve, comprising a housing having an end side; a magnet coil and a magnet armature received in said housing; a valve member; a valve closing part provided at said end side of said housing and connected with the latter by a flange connection, said valve closing part having a valve seat which cooperates with said valve member, a pressure chamber, and at least one passage connected with said valve seat, said valve closing part being composed of injection molded synthetic plastic and having at an end side facing said housing a ring-shaped recess which surrounds said pressure chamber at a distance from said chamber and is empty, said end side of said valve closing part having a first abutment body provided between said recess and said pressure chamber and a second abutment body provided between said recess and an outer periphery of said valve closing part, so that said ring-shaped recess is formed between said first abutment body and said second abutment body.

2. An electromagnetic valve as defined in claim 1, wherein said recess has a substantially semi-circular cross-section.

3. An electromagnetic valve as defined in claim 1, wherein said valve closing part at least in the region of said end side of said valve closing part has a circular shape.

4. An electromagnetic valve as defined in claim 1, wherein said valve closing part has a flange-like end with a ring, said housing having an end which is flanged around said rearwardly extending ring portion.

5. An electromagnetic valve as defined in claim 4, wherein said ring portion has a depth which is greater than a thickness of said flanged end of said housing.

6. An electromagnet valve as defined in claim 1, wherein said-first abutment body is an inner abutment body and has a wall thickness which is smaller than a wall thickness of said second abutment body.

* * * * *